Jan. 30, 1962   D. G. NELSON   3,018,593
RELEASE AND TRANSFER DEVICE
Filed Feb. 12, 1960   2 Sheets-Sheet 1
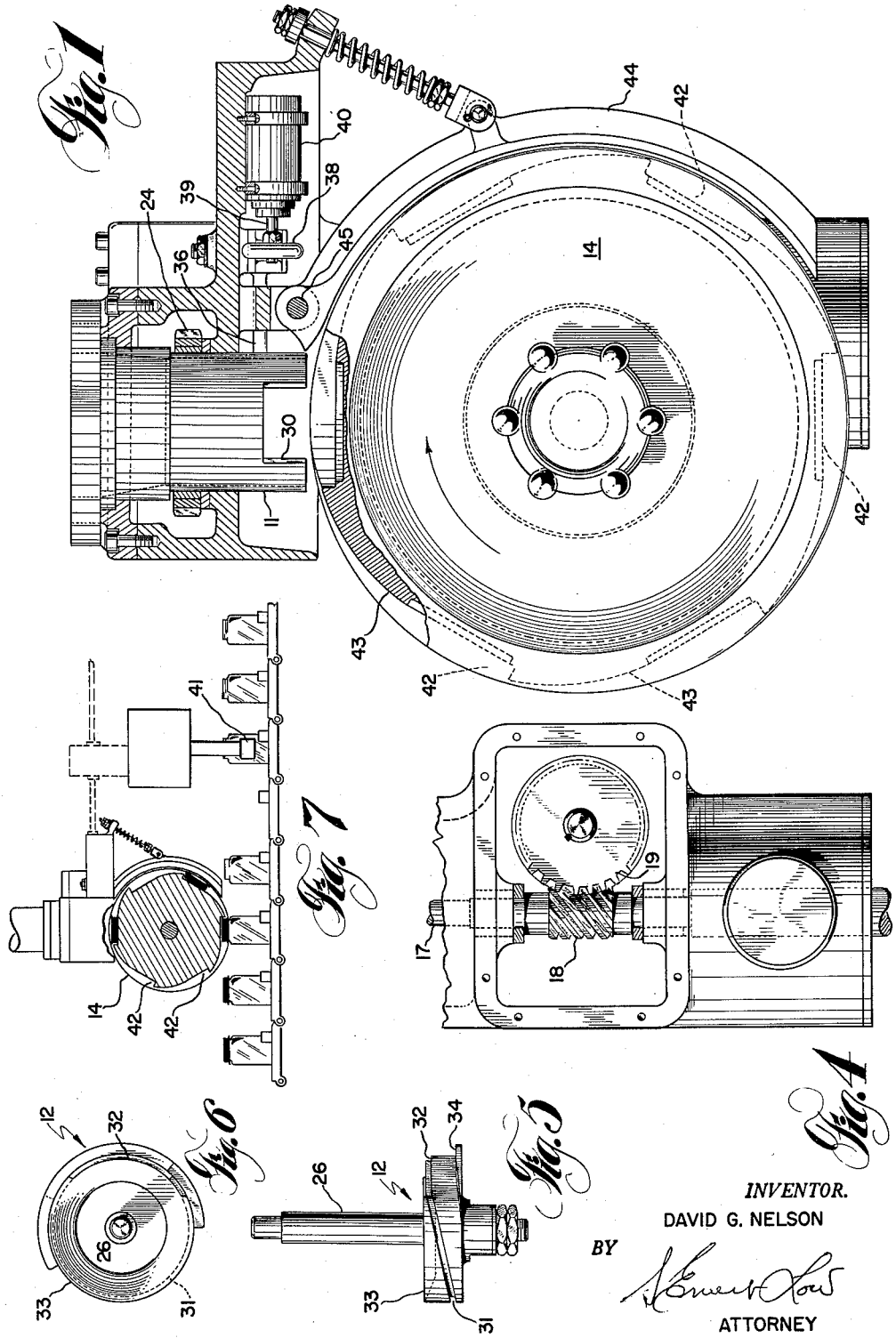
INVENTOR.
DAVID G. NELSON
BY
ATTORNEY Jan. 30, 1962 D. G. NELSON 3,018,593
RELEASE AND TRANSFER DEVICE
Filed Feb. 12, 1960 2 Sheets-Sheet 2

INVENTOR.
DAVID G. NELSON

United States Patent Office 3,018,593
Patented Jan. 30, 1962

3,018,593
RELEASE AND TRANSFER DEVICE
David G. Nelson, Richmond, Ind., assignor to Aluminum Company of America, Pittsburgh, Pa., a corporation of Pennsylvania
Filed Feb. 12, 1960, Ser. No. 8,346
5 Claims. (Cl. 53—67)

This invention relates to a device for releasing cup-shaped articles from a nested stack of such articles and delivering them singly to a subsequent operation. It is particularly suitable for the release of closure caps from a nested stack and their delivery for placement on containers.

The type of closure cap for which my invention is particularly adapted has a top and a depending skirt, the skirt having a bead at its lower edge and being slightly tapered from that edge upwardly. Such caps are nested to save space in shipment and storage and they must be removed from the nested stack for placement singly on containers being conveyed to a sealing means.

It is an object of my invention to simplify the handling of cup-shaped articles. It is another object to provide means for feeding cup-shaped articles from a nested stack of same. It is a further and more particular object to provide means for releasing such articles singly from a nested stack and transferring them for a subsequent operation. Other and further objects and advantages will appear from the following description of the device as applied to the release of closure caps from a nested stack and their transfer for placement on containers, reference being had to the accompanying drawings, in which:

FIG. 1 is an elevational view of the device with parts shown in section;

FIG. 4 is a partial elevational view showing the transfer wheel drive;

FIGS. 5 and 6 are elevational and plan views of one of the cams used in the device; and FIG. 7 illustrates schematically the relationship of a container detecting means to the device.

Figure 3:
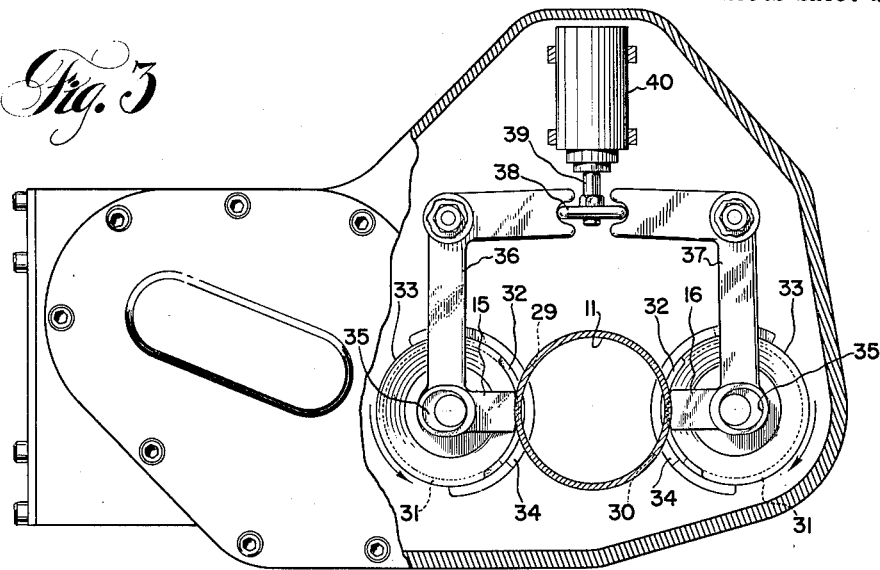
FIG. 3 is a horizontal sectional view taken on the line 3—3 of FIG. 2.
Figure 2:
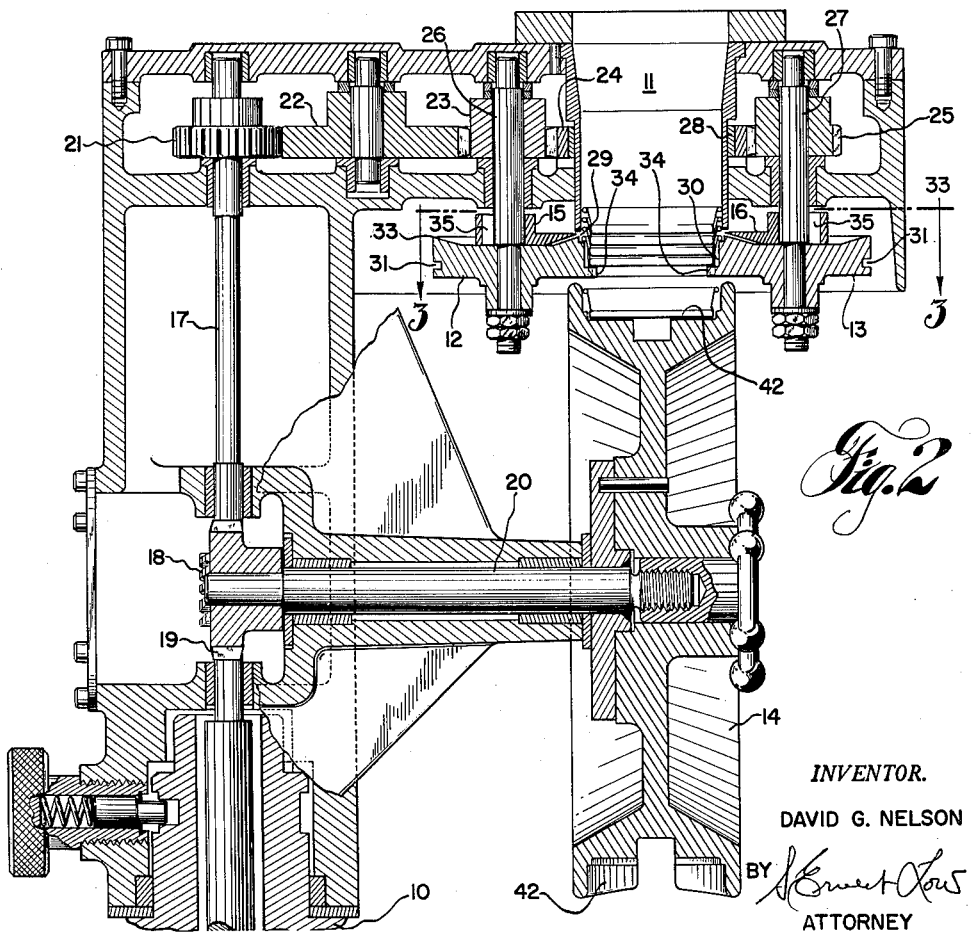
FIG. 2 is a vertical sectional view.

The entire assembly may be supported as indicated in FIG. 2 on the frame 10 of a container feeding means in advance of a sealing head that secures the closures to containers by mechanical means, or it may be so secured as to place closures on containers before or after they have entered a steam chamber for vacuum sealing.

The principal parts of the embodiment of the device chosen for illustration are the throat 11, release cams 12 and 13, transfer wheel 14 and arresting members 15 and 16.

The main shaft 17 for the machine is driven by any suitable means and suitable timing gearing, such as worm 18 and gear 19, drives the shaft 20 of the transfer wheel 14. The shaft 17 also drives gears 21, 22, 23, 24 and 25 in train. Shafts 26 and 27 are fixed in gears 23 and 25 and gear 24 is a ring gear having a bearing 28 receiving the throat 11.

The lower edge of the throat 11 is cut away to provide openings at 29 and 30 and the cams 12 and 13 are mounted on shafts 26 and 27 for peripheral entry of the cams into these openings. Each cam is provided with a cam track 31, a ledge 32 extending about 100° around the cam below its upper edge 33 and leading to the entrance to the cam track and a flange 34 extending approximately 210° around the base of the cam and tapered at its ends.

Each of the arresting members 15 and 16 has an eccentric opening 35 permitting horizontal movement with respect to the shafts 26 and 27. The arresting members are integral extensions of cranks 36 and 37 and the other ends of the cranks are engaged by an enlargement 38 on the piston 39 of an air cylinder 40, the piston being normally extended to hold the arresting members in their outer positions. A container detecting means 41 is placed adjacent to the container feeding means and designed, in any of the known ways, to control the actuation of the cylinder 40.

The transfer wheel 14 is provided with cap receiving recesses 42 and the leading edges of these recesses are faired into the face of the wheel as shown at 43. The timing of the drives for the transfer wheel and the cams is such as to provide, for each full turn of the transfer wheel, a number of revolutions of the cams equal to the number of recesses 42. It will be understood that, while I have shown six recesses in the transfer wheel, with different sizes of caps a larger or smaller number of recesses may be desirable and the timing will be modified to cause an equal number of cam revolutions. Of course, the entire apparatus is timed with the container feed to present a container for each transfer wheel recess. A guide and retainer 44, having limited movement about the pivotal connection 45, is provided adjacent to the transfer wheel on its side of downward travel.

In the operation of the device, a stack of nested and inverted closure caps is placed in the throat 11, the lowermost cap of the stack bearing at opposite arcuate portions of its bead upon the ledges 32 and opposite arcuate edge portions of its top on the flanges 34 of the cams 12 and 13. As the cams are rotated, this lowermost cap is drawn downward and out of its nested relationship by engagement of its bead in the cam tracks just as the tapered trailing ends of the flanges pass from beneath it, and will fall into a recess 42 in the transfer wheel as the ledges come under the bead of the next lowermost cap. This relationship of released cap and the next lowermost cap is shown in FIG. 2. It should be noted that, as the bead of one cap enters the cam tracks, the top edges 33 of the cams between the ledges bear under the bead of the next cap to retain it and assure positive separation.

Travelling 180° in the recess 42, the cap will be substantially upright when its leading edge meets the leading edge of a moving container, so that the cap is picked off by the container as in many known cap-feeding devices. The faired entrance 43 of each recess and the limited movement of the guide 44 cooperate to prevent damage to the caps and to assure their proper seating in the recesses.

When for any reason there is a gap in the line of containers, the detector 41, which may be a mechanical or a photo-electric device or other type of detector, operates in any suitable way to actuate the cylinder 40 to withdraw the piston 39. The resultant swinging of the cranks 36 and 37 brings the arresting members 15 and 16 to their inner positions where they extend beneath the bead of the cap next above that being withdrawn and will hold this next cap out of contact with the cams until the next container passing the detector re-establishes its former condition, actuating the cylinder to advance the piston and withdraw the arresting members so that denesting will proceed as before. Since the detector and the manner of its control of the cylinder actuation may be of any of the known types, I have shown them schematically in FIG. 7. The only thing that is critical is that the detector should be so placed that the number of containers between it and the transfer wheel, that is containers that have passed the detector and have not received closures, is equal to the unplaced closures in the recesses of the transfer wheel and the closure being withdrawn.

The apparatus may be employed in conjunction with a steam chamber when the containers are to be hermetically sealed by condensation of steam trapped in the head space of the container when the closure cap is placed thereon. Alternatively the device may be employed in advance of a sealing head whereby the seal is made by simple top pressure and maintained by reforming the skirt of the closure to conform to closure retaining formations on the container. These operations are sometimes combined and this is particularly true in applying two-piece caps of the type comprising a sealing disc and a flanged retaining collar. The disc of such a cap is usually sealed by condensation of trapped steam to provide a vacuum and the collar is retained as by forming threads in its skirt to conform to container threads. It will be seen that the device described can be used for all such sealing operations, and will be advantageous wherever the closures have a taper permitting their nesting.

While I have described my invention as applied to the release of nested container closures and their transfer for placement on containers, it will be understood that it is equally adapatable to the release and transfer of any cup-shaped articles commonly provided in nested stacks and presenting an edge formation that may be engaged in cam tracks in the manner described. My invention embraces such uses and any variations from the described structure that are within the scope of the appended claims.

What is claimed is:

1. A release and transfer device for nested cup-shaped articles, each having a laterally extending formation on its skirt, comprising a pair of driven shafts each carrying a cylindrical cam presenting a cam track for withdrawing engagement with opposite arcuate portions of said formation on one of the nested articles and an edge portion for retaining engagement with opposite arcuate portions of said formation on an adjacent nested article, a retaining member mounted on each of said shafts above the cam carried thereby and laterally movable with respect to said shaft and said cam into position beneath said formation on an article to prevent engagement of said formation with said cam track, and means for receiving and conveying articles withdrawn by said cams.

2. A release and transfer device for nested cup-shaped articles, each having a laterally extending formation on its skirt, comprising a cylindrical throat to receive the nested articles, diametrically opposed portions of the delivery end of said throat being cut away, a pair of driven shafts each carrying a cylindrical cam arranged for peripheral entry into one of the cut-away portions and presenting a cam track for withdrawing engagement with opposite arcuate portions of said formation on one of the nested articles and an edge portion of limited arcuate extent for retaining engagement with opposite arcuate portions of said formation on an adjacent nested article, a retaining member mounted on each of said shafts above the cam carried thereby and laterally movable with respect to said shaft and said cam into position beneath said formation on an article to prevent engagement of said formation with said cam track, and means for receiving and conveying articles withdrawn by said cams.

3. A release and transfer device for nested cup-shaped articles, each having a laterally extending formation on its skirt, comprising a cylindrical throat to receive the nested articles in inverted position, diametrically opposed portions of the lower end of said throat being cut away, a pair of driven shafts each carrying a cylindrical cam arranged for peripheral entry into one of the cut-away portions and presenting a single cam track for withdrawing engagement over opposite arcuate portions of said formation on one of the nested articles, an upper edge portion for retaining engagement beneath opposite arcuate portions of said formation on the next lowermost nested article and an arcuate flange at its lower edge, a retaining member mounted on each of said shafts above the cam carried thereby and laterally movable with respect to said shaft and said cam into position beneath said formation on an article to prevent engagement of said formation with said cam track, and an upright driven transfer wheel below said cams having article receiving recesses therein.

4. A release and transfer device for nested closure caps, each having a bead at the edge of its skirt, comprising a cylindrical throat to receive the nested closure caps, diametrically opposed portions of the delivery end of said throat being cut away, a pair of driven shafts each carrying a cylindrical cam arranged for peripheral entry into one of the cut-away portions and presenting a cam track for withdrawing engagement with opposite arcuate portions of said bead on one of the nested closure caps and an upper edge portion for retaining engagement with opposite arcuate portions of said bead on an adjacent nested closure cap, a retaining member mounted on each of said shafts above the cam carried thereby and laterally movable with respect to said shaft and said cam into position beneath the bead of a cap to prevent engagement of said bead with said cam track, and means for receiving closure caps withdrawn by said cam and conveying them singly for placement on containers.

5. A device for releasing closure caps, each having a bead at the edge of its skirt, from a nested stack and transferring them singly for placement on containers comprising a cylindrical throat to receive the nested closure caps in inverted position, diametrically opposed portions of the lower end of said throat being cut away, a pair of driven shafts each carrying a cylindrical cam arranged for peripheral entry into one of the cut-away portions and presenting a cam track for withdrawing engagement over opposite arcuate portions of said bead on one of the nested closure caps and an upper edge portion for retaining engagement beneath opposite arcuate edge portions of said bead on the next lowermost nested closure cap, a retaining member mounted on each of said shafts above the cam carried thereby and reciprocable into and out of the adjacent cut-away portion, an upright driven transfer wheel below said cams having closure cap receiving recesses therein, means carrying a line of containers beneath the transfer wheel, means normally holding both of said retaining members withdrawn from said cut-away portions, and means responsive to a gap in the line of containers to move both of said retaining members into the cut-away portions and beneath the bead of a closure cap in the nested stack to prevent engagement of said bead with said cam track.

References Cited in the file of this patent

UNITED STATES PATENTS

| | | |
|---|---|---|
| 1,470,348 | Clark | Oct. 9, 1923 |
| 2,659,522 | Ninneman et al. | Nov. 17, 1953 |
| 2,721,002 | Smith | Oct. 18, 1955 |
| 2,840,963 | Osmend | July 1, 1958 |
| 2,906,072 | Carlson | Sept. 29, 1959 |
| 2,946,481 | Carew | July 26, 1960 |